(12) United States Patent
Adelman et al.

(10) Patent No.: US 9,582,132 B1
(45) Date of Patent: Feb. 28, 2017

(54) SYSTEM FOR INTERACTIVE HELP

(71) Applicant: BoomerSurf LLC, Bend, OR (US)

(72) Inventors: Paula Adelman, Caesaria (IL); Lior Aharoni, Tel Aviv (IL)

(73) Assignee: BOOMERSURF LLC, Bend, OR (US)

( * ) Notice: Subject to any disclaimer, the term of this patent is extended or adjusted under 35 U.S.C. 154(b) by 144 days.

(21) Appl. No.: 14/084,786

(22) Filed: Nov. 20, 2013

Related U.S. Application Data

(60) Provisional application No. 61/728,632, filed on Nov. 20, 2012, provisional application No. 61/869,115, filed on Aug. 23, 2013.

(51) Int. Cl.
*G06F 3/048* (2013.01)

(52) U.S. Cl.
CPC .................................. *G06F 3/048* (2013.01)

(58) Field of Classification Search
CPC ....... G06F 2009/45587; G06F 11/1451; G06F 17/30067; G06F 11/3476
See application file for complete search history.

(56) References Cited

U.S. PATENT DOCUMENTS

| | | | |
|---|---|---|---|
| 2005/0042593 A1 | 2/2005 | Hopkins et al. | |
| 2007/0015118 A1 | 1/2007 | Nickell et al. | |
| 2007/0239760 A1 | 10/2007 | Simon | |
| 2008/0288922 A1 | 11/2008 | Chapman | |
| 2010/0205529 A1 | 8/2010 | Butin et al. | |
| 2010/0205530 A1* | 8/2010 | Butin | G06F 9/4446 715/715 |
| 2011/0010659 A1 | 1/2011 | Kim et al. | |
| 2011/0047462 A1 | 2/2011 | Butin et al. | |
| 2011/0047488 A1 | 2/2011 | Butin et al. | |
| 2011/0047514 A1 | 2/2011 | Butin et al. | |
| 2011/0061019 A1 | 3/2011 | Clift et al. | |
| 2012/0239986 A1 | 9/2012 | Kraus et al. | |
| 2013/0064522 A1 | 3/2013 | Touma | |
| 2013/0346470 A1* | 12/2013 | Obstfeld | G06F 9/5044 709/202 |

FOREIGN PATENT DOCUMENTS

| | | |
|---|---|---|
| EP | 2 538 320 | 12/2012 |
| EP | 2 538 323 | 12/2012 |
| WO | 2007085603 | 8/2007 |
| WO | 2013061325 | 5/2013 |

\* cited by examiner

*Primary Examiner* — William Bashore
*Assistant Examiner* — Rayeez Chowdhury
(74) *Attorney, Agent, or Firm* — The Law Office of Joseph L. Felber (57) ABSTRACT

Method and system for the provision of interactive assistance over a network for a user to complete a desired computing task on a user computing device. Task-guides are generated on task-guide generators operating on author user devices. Each task-guide includes a sequence of processes, each process including an action for the user to perform in association with a graphical user interface (GUI) object displayed on the user computing device. The process obtains information about the GUI object using at least one data-gathering technique. An administrator operating on a server computing device receives a task-assistance request from a task-guide executor operating on an end user device, and sends back at least one suitable task-guide over the network. The task-guide executor executes the task-guide on the end user device, displaying a sequence of instructions for the end user to follow in order to complete the desired computing task.

22 Claims, 7 Drawing Sheets

SYSTEM FOR INTERACTIVE HELP

CROSS REFERENCES TO RELATED APPLICATIONS

This application is related to and claims priority from commonly owned U.S. Provisional Patent Application Ser. No. 61/728,632 and 61/869,115, both entitled: System for Interactive Help, filed on Nov. 20, 2012, and Aug. 23, 2013, the disclosures of both applications are incorporated by reference herein.

FIELD OF THE INVENTION

The invention generally relates to online automated and semi-automated help systems.

BACKGROUND OF THE INVENTION

With the rapid adoption of computer technology worldwide, increasing numbers of computer users are confronted with the problems of learning how to navigate new operating systems, software, and web content. The user typically enters a query into a designated help query window, and is provided with several listings, only some of which may actually include a predefined fixed set of instructions, which may or may not address the problem for which the user's query was made.

The user must then perform the steps listed by the instructions on his/her computer. This typically involves alternatively performing actions and reading the instructions. Such a process may frustrate the user, as they fail to complete the instructions, resulting in abandonment of the task, or failure, as the user fails to correctly follow the instructions, or the instructions are inappropriate for the user's actual situation.

SUMMARY OF THE INVENTION

In accordance with one aspect of the invention, there is thus provided a method for the provision of interactive assistance over a network for a user to complete a desired computing task on a user computing device. The method includes the procedure of generating a plurality of task-guides, each of the task-guides including a sequence of processes, each of the processes including at least one action for the user to perform in association with at least one graphical user interface (GUI) object displayed on the user computing device, where the process obtains information about the GUI object using at least one data-gathering technique. The method further includes the procedures of receiving from the user computing device a task-assistance request over the network, and sending at least one suitable task-guide to the user computing device over the network. The user computing device is configured to execute the task-guide to display a sequence of instructions for the user to follow in order to complete the desired computing task. The data-gathering technique may include any of the following: sending a request to an operating system (OS) application programming interface (API); image processing of the contents displayed on the display screen of the user computing device; obtaining a GUI data structure from a library file; analyzing a web page; sending a request to a web browser API; and obtaining information associated with a hardware component of the user computing device. The data-gathering technique may be respective of at least one computing environment, such as: software; operating system; website; and hardware. A task-guide may be generated using at least one pre-existing process. A process of a generated task-guide may be defined to operate on multiple computing environments, platforms, preferences, or settings. The generated task-guides may be stored in a database that is publically accessible to a plurality of author users, allowing at least a portion of the author users to generate or edit the task-guides. The method may further include the procedure of obtaining data associated with at least one executed task-guide from the user computing device over the network. The method may further include the procedure of updating at least one task-guide, in accordance with the obtained data. Updating a task-guide may include any of the following: altering at least one process of the task-guide, associating the task-guide with at least one computing environment; updating at least one user interface data structure associated with the task-guide; customizing a subsequent execution of the task-guide on at least one user computing device; improving the effectiveness or efficiency of the task-guide; and making the task-guide more generic. The user computing device may be configured to store data associated with an executed task-guide, for customizing a future execution of the task-guide on the user computing device. The method may further include the procedure of updating at least one of the task-guides associated with a common application, in accordance with update information obtained from the application. The method may further include the procedure of monitoring and testing at least one task guide, to assess performance. The testing may include executing the task-guides on a plurality of virtual machines (VMs) operating with different computing environments. The task-assistance request may include information associated with the user computing device, where the suitable task-guide sent to the user computing device may be selected in accordance with the information.

In accordance with another aspect of the invention, there is thus provided a system for the provision of interactive assistance over a network for a user to complete a desired computing task on a user computing device. The system includes a task-guide generator operating on an author user computing device, and an administrator operating on a server computing device. The task-guide generator is configured to generate at least one task-guide that includes a sequence of processes, each of the processes including at least one action for the user to perform in association with at least one GUI object displayed on the user computing device, where the process obtains information about the GUI object using at least one data-gathering technique. The administrator is configured to receive a task-assistance request over the network from an end user computing device, and to send at least one suitable task-guide to the end user computing device over the network. The system further includes a task-guide executor operating on the end user computing device, the task-guide executor being configured to execute the task-guide on the end user computing device, displaying a sequence of instructions for the user to follow in order to complete the desired computing task. The data-gathering technique may include any of the following: sending a request to an operating system (OS) application programming interface (API); image processing of the contents displayed on the display screen of the user computing device; obtaining a GUI data structure from a library file; analyzing a web page; sending a request to a web browser API; and obtaining information associated with a hardware component of the user computing device. The administrator may obtain data associated with at least one executed task-guide from the end user computing device over the network. The administrator may update at least one task-guide, in accordance with the obtained data.

BRIEF DESCRIPTION OF THE DRAWINGS

Attention is now directed to the drawings, where like reference numerals or characters indicate corresponding or like components. In the drawings.

DETAILED DESCRIPTION OF THE EMBODIMENTS

The present invention provides a method and system for interactively guiding a user to perform a desired computing task by displaying customized step-by-step instructions to the user in a clear and straightforward manner.

Figure 1:
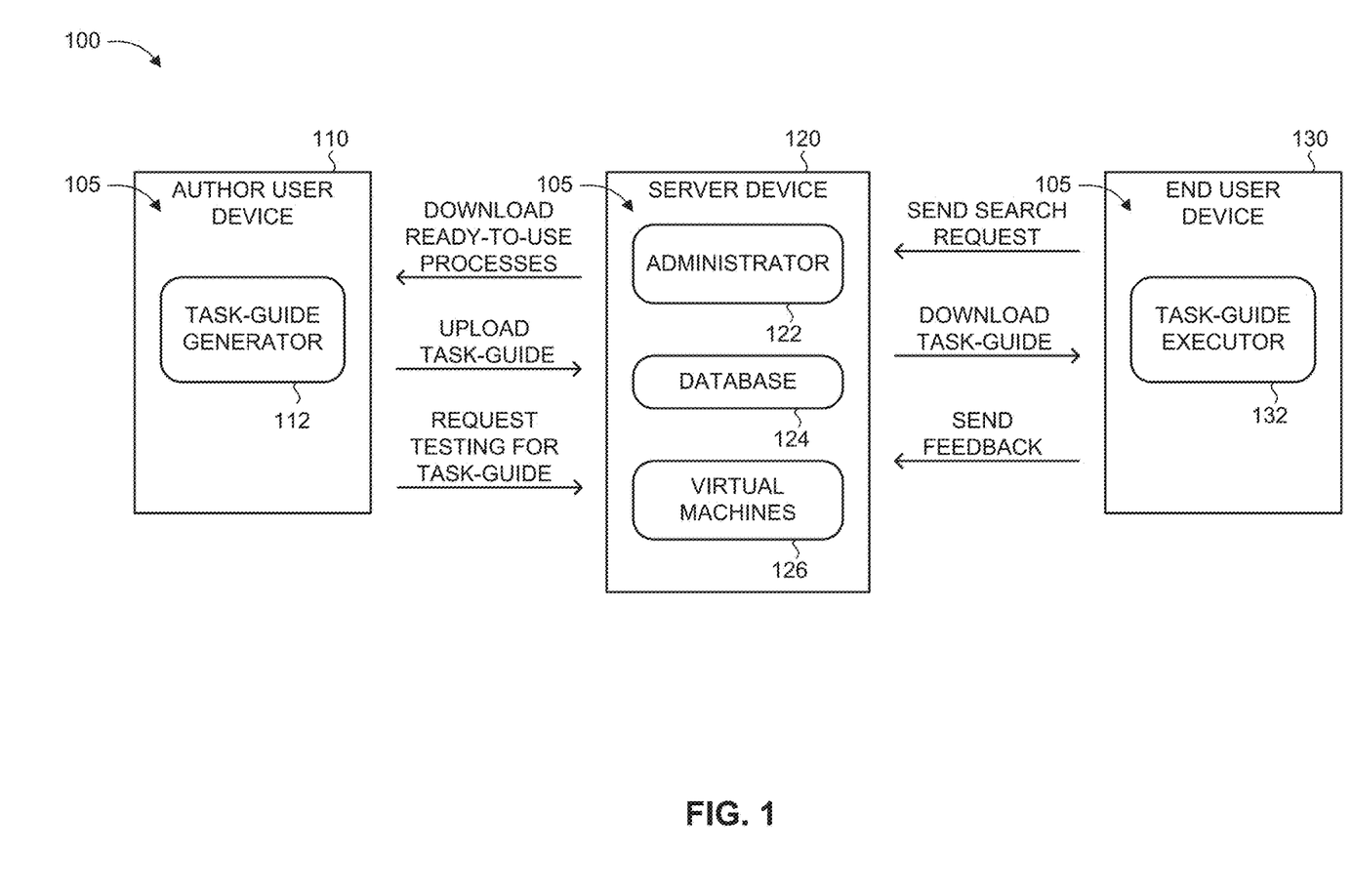
FIG. 1 is a schematic illustration of an environment which supports a computer-implemented system for the provision of interactive assistance to a user, constructed and operative in accordance with an embodiment of the invention.
Figure 2:
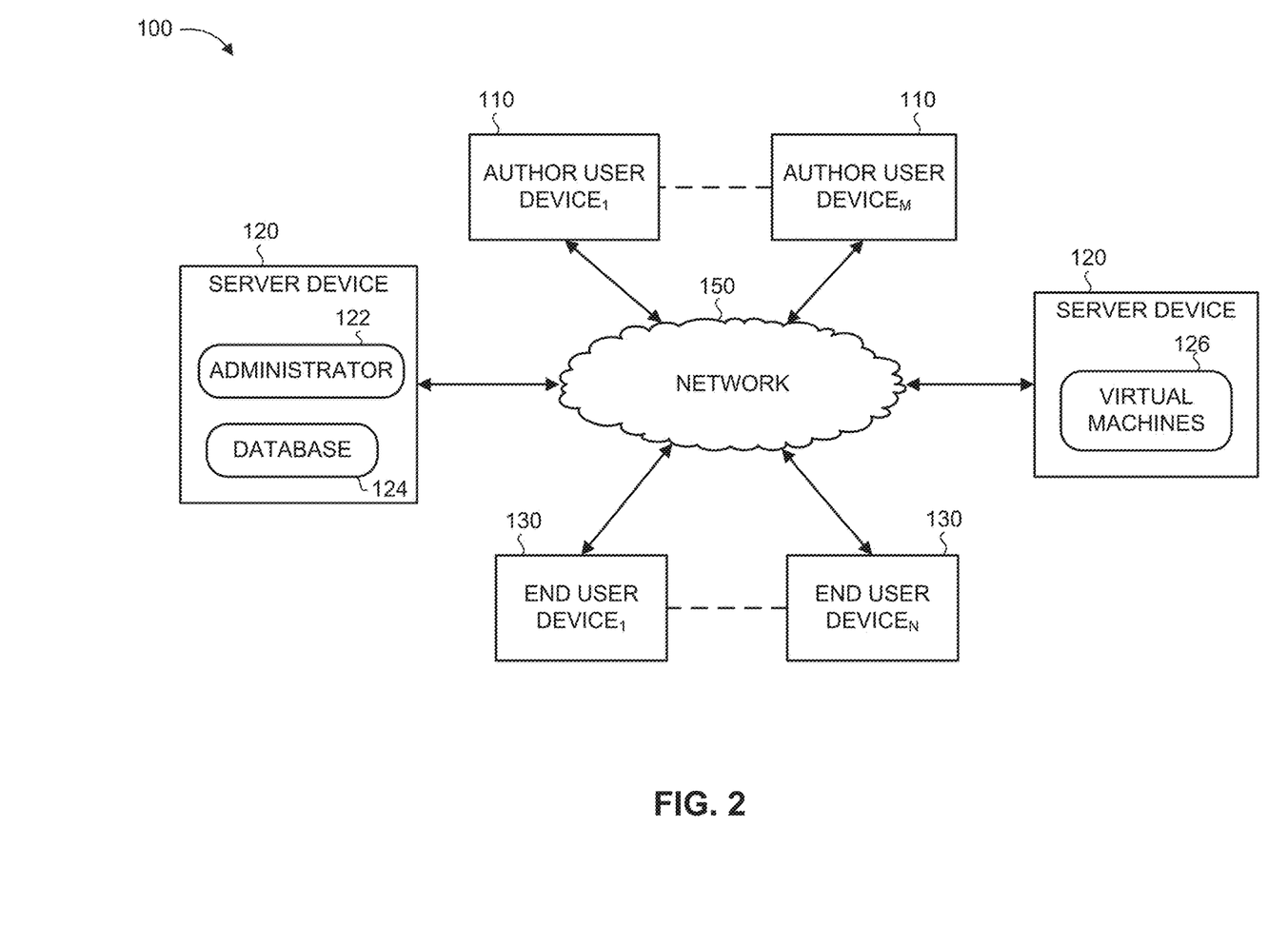
FIG. 2 is a schematic illustration of an exemplary network topology for the environment of FIG. 1, constructed and operative in accordance with an embodiment of the invention.

Reference is now made to FIGS. 1 and 2. FIG. 1 is a schematic illustration of an environment, generally referenced 100, which supports a computer-implemented system, generally referenced 105, for the provision of interactive assistance to a user, constructed and operative in accordance with an embodiment of the invention. FIG. 2 is a schematic illustration of an exemplary network topology for environment 100, constructed and operative in accordance with an embodiment of the invention. Environment 100 includes at least one author user device 110, a server device 120, and at least one end user device 130. Server device 120 is communicatively coupled with author user device 110 and with end user device 130 by a communications network 150. Environment 100 may be considered in the framework of a client-server architecture in which author user device 110 and end user device 130 embody "clients" while server device 120 embodies a "server". Server device 120 is typically a remote computer or remote computer system, machine, or computer program therein, that is accessible over a communications medium or network, and that provides services to other computer programs (and their users), in the same or other computers, including user devices 110, 130. Author user device 110 and end user device 130 may be any type of computer, computational device and/or machine, configured for two-way communication with server 120 over a communications medium or network 150. For example, author user device 110 or end user device 130 may be embodied by a computing device such as: a personal computer (PC), a desktop computer, a laptop computer, a netbook computer, a tablet computer, a handheld computer, a smartphone, a mobile phone, a personal digital assistant (PDA), a portable media player, a gaming console, any combination of the above, and the like.

Each of devices 110, 120 130 includes processors and other computer components for performing the requisite functions as detailed below, and the components may be based in hardware, software, or combinations thereof. While a single device is shown for each of devices 110, 120, 130, the functionality associated with each of these devices may also be distributed among multiple computing devices which may reside at a single location or at multiple locations. These single or multiple devices include internal memory, storage media, processors, microprocessors and databases for performing the functions of the disclosed subject matter, and/or be associated with external memory, storage media, processors, microprocessors and databases.

System 105 includes a task-guide generator 112, an administrator 122, and a task-guide executor 132. System 105 may further include a database 124, and optionally includes a plurality of virtual machines (VMs) 126. Task guide generator 112 and task-guide executor 132 may include software applications installed on and/or adapted to be run on author user device 110 and end user device 130, respectively. Similarly, administrator 122 may include at least one software application installed on server device 120 for implementing its various functions. Database 124 and VMs 126 are stored on server device 120, or otherwise accessible to administrator 122. For example, database 124 may be stored at a first location in a memory accessible to administrator 122 while virtual machines 126 reside at a different location accessible to administrator 122.

Referring to FIG. 2, a plurality of (e.g., a total of "M") author user devices 110 and a plurality of (e.g., a total of "N") end user devices 130 are linked with server device 120 via a communications network 150. Communications network 150 (i.e., "network") is configured to provide for the exchange of data between the respective components of server device 120 and user devices 110, 130, as necessary. Network 150 may include, for example: a wired network, a wireless network, a local area network (LAN), a wide area network (WAN), a metro area network (MAN), worldwide web (WWW), Internet, a cellular network, any combination thereof, and the like.

Task-guide generator 112 allows an operator of author user device 110 (i.e., an "author user") to create a new task-guide or to edit an existing task-guide. The term "task-guide" as used herein, represents a program (or "script") which, when executed on a user computing device, presents a sequence of instructions to be followed by the user to allow him/her to successfully perform a desired task on the computing device. Examples of such tasks include: calling a person using the Skype application; adding a new contact on Skype; sending a large file to somebody using the Dropbox application; resizing a picture and emailing to a friend; and the like.

The task-guide is represented as a series of processes or "sub-tasks", where each process includes at least one action that the user must perform in association with at least one graphical user interface (GUI) object that is visible on the display screen of the end user while attempting to perform the desired task. The process obtains information about the relevant GUI object(s) for the task using at least one data-gathering technique, which may be selected in accordance with the user computing environment and other factors. For example, certain process data-gathering techniques may be utilized when attempting to obtain information associated with a software application, other process data-gathering techniques may be utilized when attempting to obtain information associated with an operating system of the user computing device, still other process data-gathering techniques may be utilized in conjunction with an Internet website, and still other process data-gathering techniques may be utilized to obtain information about a hardware component of the user computing device.

One such process data-gathering technique is sending a request to an operating system (OS) application programming interface (API), which may be suitable for implementing in conjunction with OS or hardware environments. Another process data-gathering technique is using image processing to analyze images displayed on the display screen of the user computing device, which may be suitable for implementation in software environments. Yet another process data-gathering technique is obtaining a GUI data structure from a library file, which may be suitable for implementation in software, OS or website environments. A further process data-gathering technique is extracting information by webpage analysis (e.g., "web scraping" or "web harvesting") or obtaining information from a web browser API, which may be suitable for a website environment. Yet a further process data-gathering technique is obtaining information associated with a hardware component of the user computing device, which may be suitable for implementing in a hardware environment. Examples and further elaboration of these process data-gathering techniques will be provided hereinbelow.

An author user may create a new task-guide using at least one pre-existing process, which may be publicly available and accessible to the author, such as being stored in database 124 (or in a separate "process database" of server device 120). Accordingly, an author user may also create a new process for a particular task-guide, and this process may subsequently be made available to be used (if applicable) in the creation of different task-guides. For example, an example task may be: "uploading a photo from a camera to Facebook". In order to create this task, the author user may define the following series of processes (sub-tasks): "1. obtain the photo from the camera"; "2. run the Picasa application"; "3. "resize the photo in Picasa"; "4. go to website <www.facebook.com>; "5. upload the resized photo to the Facebook page". Thus, when defining the $2^{nd}$ process ("running the Picassa application"), the author user may utilize the more abstract pre-existing processes: "browsing MyComputer" and "running a program", for example. Furthermore, the defined processes may be later accessed by another author user and utilized as part of another task. For example the $3^{rd}$ process (resizing photo in Picasa) may be incorporated within the task of: "sending a photo album via Dropbox". Similarly, an author user may incorporate a pre-existing task-guide (i.e., a series of processes) as part of another (more complex) task-guide. The author user may also obtain statistical information about certain processes or task-guides from administrator 122, which may be taken into account during the creation of a new task-guide.

A task-guide may be created in a generic manner, allowing the task-guide to operate on multiple different computing environments. For example, a task-guide may include processes that are defined to operate respective of multiple versions of an OS (e.g., Windows XP/Windows Vista/Windows7/Windows 8) or multiple versions of a software application (e.g., Skype versions 4.x/5.x/6.x for Windows). Furthermore, the processes of an individual task-guide may be defined to operate respective of multiple different settings of the end user device (for example, regardless of: language, location, display size, font sizes, and the like). In addition, there may be separate task-guides intended for a common task but designated for different computing environments. For example, there may be one "upload a photo to Facebook" task-guide for Windows OS, another for OS-X, another for Linux, another for iOs, and another for Android.

The collection of created task-guides are uploaded to and stored on database 124. When an operator of end user device 130 (i.e., an "end user") wants to receive assistance for a desired task, the end user enters a request for such assistance via task-guide executor 132. Task-guide executor 132 proceeds to transmit a search request to administrator 122, which attempts to locate a suitable task-guide stored in database 124 for the requested task. If no suitable task-guide is identified, administrator 122 may provide the end user with the closest match available (e.g., for performing a similar task), or may provide a set of available task-guides for similar tasks for the end user to choose from. Alternatively, administrator 122 may send back a notification that there is no task-guide available for the requested task. Such a notification may also be broadcast to selected author user devices 110, for ensuring the subsequent creation of the required task-guide. If administrator 122 identifies a suitable task-guide (or multiple task-guides) in database 124, the task-guide(s) is delivered (over network 150) to task-guide executor 132, which then executes the task-guide on end user device 130 to display a sequence of instructions for the user to follow in order to complete the desired task.

Figure 3:
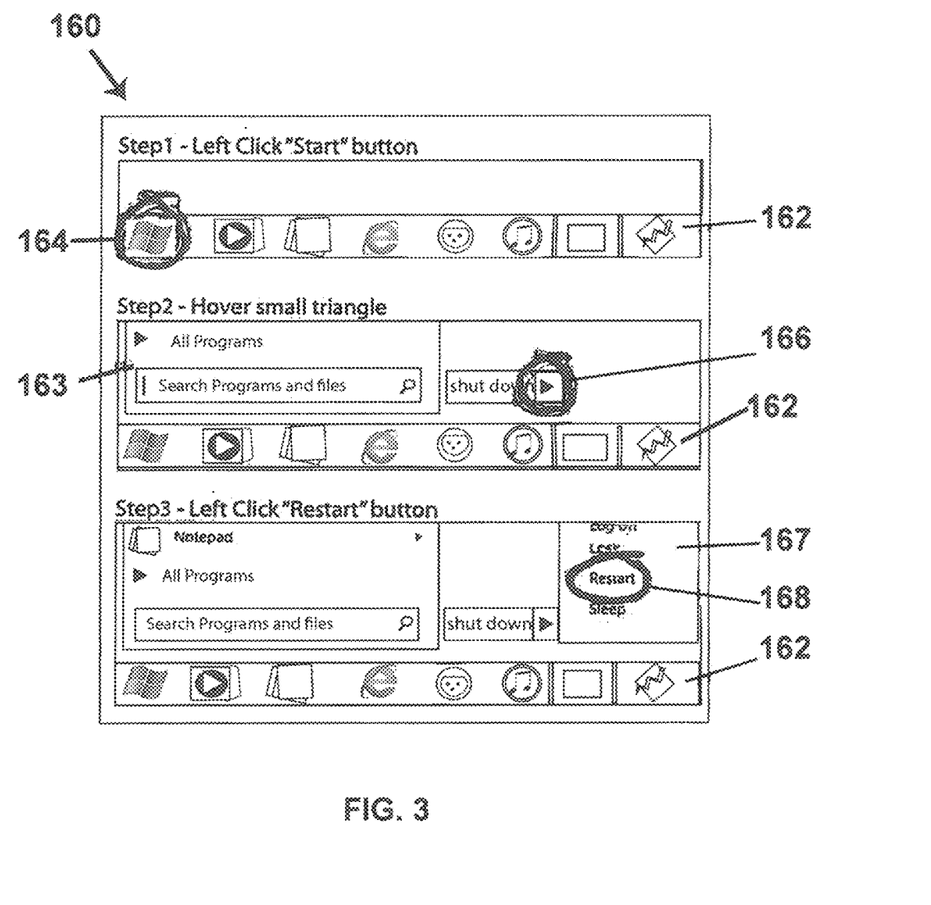
FIG. 3 is an illustration of a series of screenshot images displayed by an example task-guide demonstrating how to restart a computer in the Windows 7 OS, operative in accordance with an embodiment of the invention.

Reference is now made to FIG. 3, which is an illustration of a series of screenshot images displayed by an example task-guide, referenced 160, demonstrating how to restart a computer in the Windows 7 OS, operative in accordance with an embodiment of the invention. In the first step, task-guide 160 depicts the windows taskbar 162 while highlighting the "Start" icon 164 at the bottom of the screen, along with the text message "Left click start button". Once this action has been performed, the second step of task-guide 160 depicts the window 163 that should appear next, while highlighting the "Shutdown" tab icon 166, and displaying the text message "Hover small triangle". After the user correctly hovers over the shutdown icon 166, the third step of task-guide 160 depicts the window 167 that should appear next, while highlighting the "Restart" text selection 168, and displaying the text message "Left click 'Restart' button". Following the correct implementation of this instruction, the end user will have successfully completed the task of restarting the computer, thus terminating task-guide 160.

Each task-guide is composed of a sequence of processes that identifies at least one GUI object being displayed on the end user device 130 in the course of assisting the user to complete the desired task. As discussed hereinabove, these processes obtain information about the relevant GUI object(s) using at least one data-gathering technique. One such technique involves image processing (i.e., computer vision) methods for acquiring, processing and analyzing the screen content and to recognize desired target objects on the screen. This technique may utilize pattern matching algorithms to determine an optimal match for a predefined target. Another process data-gathering technique involves analyzing the internal GUI structure of the objects in question, as defined by the GUI creators. This analysis is performed by sending requests to the OS API to provide information about the GUI elements visible to the end user at a particular moment.

Figure 4:
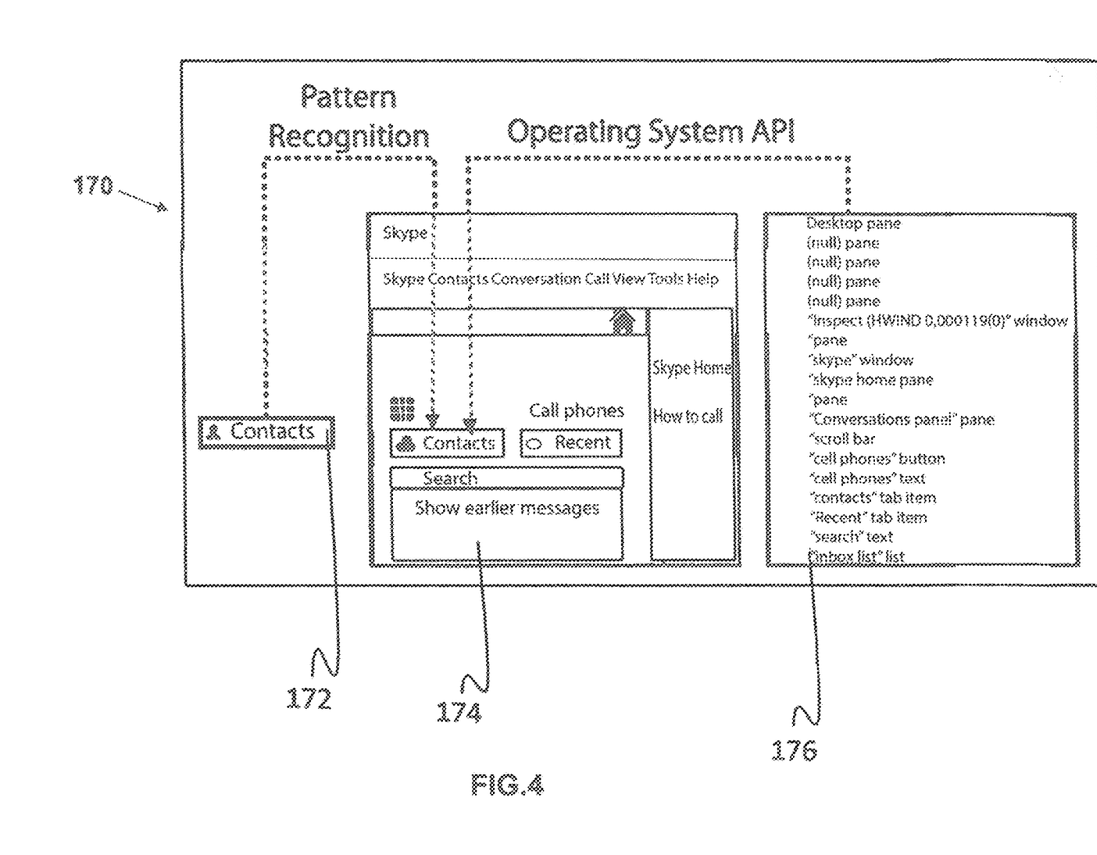
FIG. 4 is an illustration of screenshot images depicting data-gathering techniques for identifying an exemplary GUI object, operative in accordance with an embodiment of the invention.

A given process may have a number of available options when multiple data-gathering techniques are equally effective for acquiring the relevant information. Reference is now made to FIG. 4, which is an illustration of screenshot images, generally referenced 170, depicting data-gathering techniques for identifying an exemplary GUI object, operative in accordance with an embodiment of the invention. In the example of FIG. 4, a process is required to identify the "Contacts" button in the Skype application (e.g., as part of a task-guide which, for example, guides the user through the process of implementing a videoconferencing session over Skype with a selected acquaintance). Accordingly, the "Contacts" button represents the particular GUI object that the process is attempting to identify. One possible approach involves processing and analyzing the main GUI window 174 visible to the end user running the Skype application, such as by implementing suitable pattern recognition algorithms on GUI window 174 to identify the "Contacts" icon 172. An alternative approach involves sending a request to the Windows Automation API (WAAPI) to provide the internal definition of the "Contacts" button. Window 176 depicts the UI tree exposed by the WAAPI, in which a target can be defined by its path in the tree and its parameters. Accordingly, the parameters of the "Contacts" button include: its name (i.e., "Contacts"), and its LocalizedControlType (i.e., "tab item").

Each of the available process data-gathering techniques may be advantageous or disadvantageous in certain situations, and are therefore evaluated based on different criteria when establishing which data-gathering technique(s) a certain process should implement and in what order. For example, certain data-gathering techniques, such as the image processing approach, may be more sensitive to different preferences or OS settings on the end user device 130 (e.g., variations in desktop background, display magnification, or font sizes), than other data-gathering techniques, such as API requests, which are more robust to the user preferences and settings. Conversely, the image processing technique may be more robust in response to different versions of a software application, whereas API requests may encounter difficulties when implemented with a software application that utilizes the API in a non-standard manner. In addition, the various process data-gathering techniques may vary in their respective performance speeds, as well as their sensitivity to different computing platforms and environments (e.g., their ability to operate correctly in different operating systems or website browsers).

Figure 5:
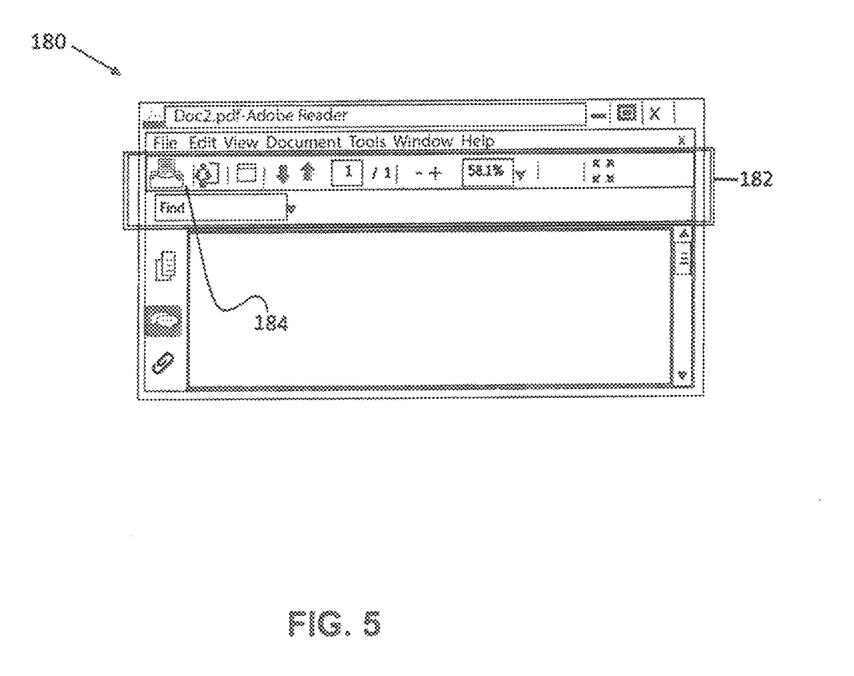
FIG. 5 is an illustration of a screenshot image of an application toolbar that includes portions that are not recognized by the Operating System (OS) Application Programming Interface (API), operative in accordance with an embodiment of the invention.

A specific process may incorporate a hybrid of the available data-gathering techniques in order to acquire the relevant information. In general, a process should obtain as much information as possible about the relevant GUI object(s), such as by implementing a number of suitable data-gathering techniques. Reference is now made to FIG. 5, which is an illustration of a screenshot image, generally referenced 180, of an application toolbar that includes portions that are not recognized by the OS API, operative in accordance with an embodiment of the invention. In the example of FIG. 5, a process is required to identify the "Printer" button in the Adobe Reader application (e.g., as part of a task-guide which, for example, guides the user through the process of printing out a PDF document). The main GUI window visible to the end user running the Adobe Reader application includes a toolbar 182, which is a UI element that does not provide API access to the interior portion thereof. Therefore, a direct API request for the "Printer" button located within toolbar 182 could not be implemented, as the elements inside the toolbar region are not recognized by the OS API. Instead, the process could use a more general API request to initially identify the toolbar region 182, and then subsequently use an image processing technique within toolbar 182 in order to locate the "Printer" icon 184.

When creating or editing a task-guide, it may be preferable to define the processes in a generic manner so as to enable the task-guide to successfully operate irrespective of the specific computing environment or settings/preferences employed on end user device 130. Since the creation of the task-guide (by task-guide generator 112) is performed on a specific author user device 110 having a specific computing environment and settings, the generated task-guide should at a minimum be capable of operating on an end user device 130 having the same (or similar) computer environment and settings (e.g., another computing device running the same OS and software versions as author user device 110). By defining the task-guide processes in a sufficiently robust manner, it may be possible to ensure that the task-guide also correctly operates on end user devices 130 having a substantially different computer environment and settings than that of author user device 110 during the creation of the task-guide. For example, a process may be defined to implement multiple data-gathering techniques for a common objective, and/or to execute the data-gathering techniques in a predetermined order, to ensure robustness (i.e., ability to operate correctly in different computing environments and user settings) and efficiency (e.g., performance speed, consistency, clarity, minimalism) of the executed task-guide. For example, referring to the example task-guide 160 discussed in FIG. 3 (i.e., demonstrating how to restart a computer in the Windows 7 OS), the GUI object associated with each step of task guide 160 may be identified in terms of an OS API request data-gathering technique, or in terms of an image processing data-gathering technique (or both). In particular, an OS API request may define the given GUI object by its path in the Microsoft User Interface Automation (UIA) tree accessible by the WAAPI, whereas an image processing approach may define the given GUI object by its pixel map.

Figure 6:
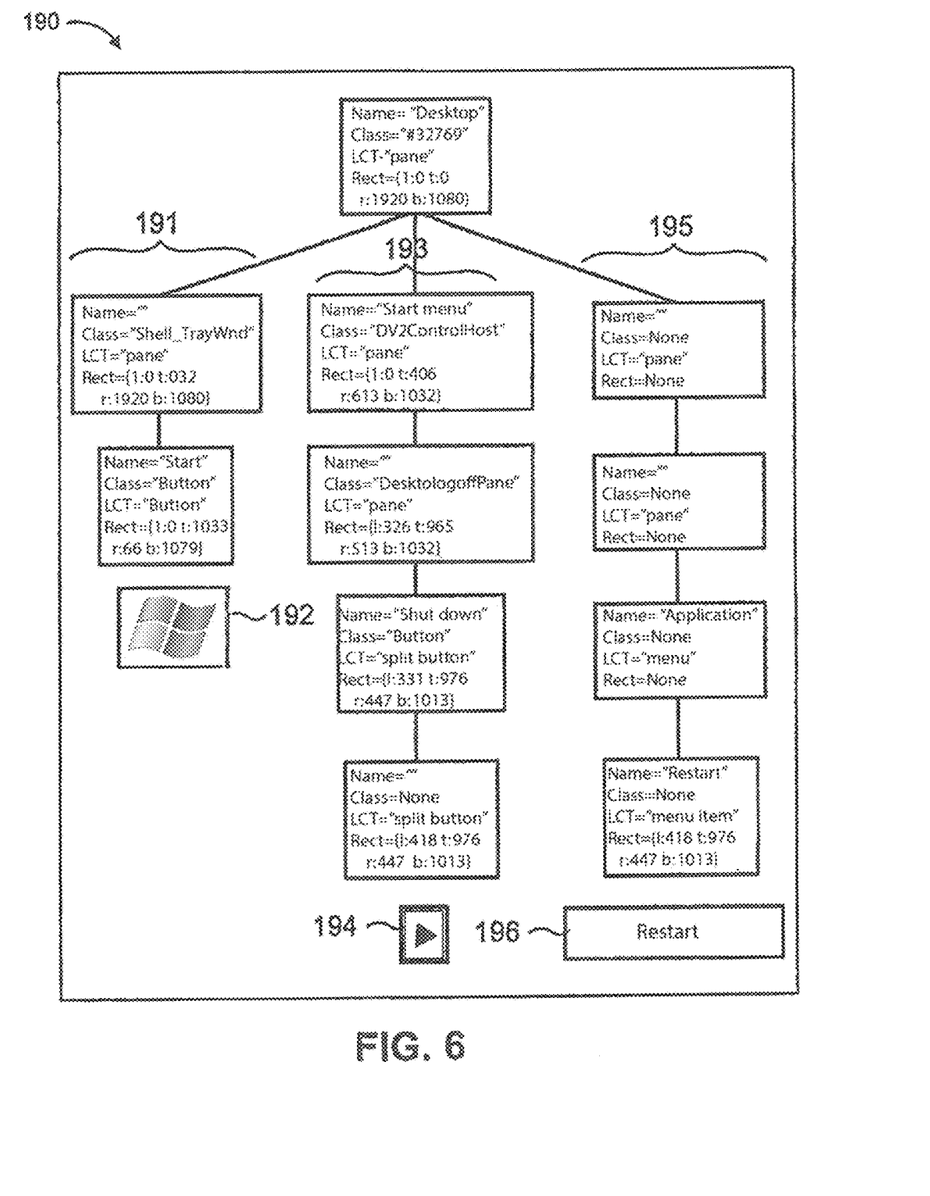
FIG. 6 is a diagram of an exemplary Microsoft UI Automation WIN tree exposed by the Windows Automation API (WAAPI) representing objects on a desktop, operative in accordance with an embodiment of the invention.

Reference is now made to FIG. 6, which is a diagram of an exemplary Microsoft UIA tree, generally referenced 190, exposed by the WAAPI representing objects on a desktop, operative in accordance with an embodiment of the invention. The portion of UIA tree 190 depicted in FIG. 6 includes three separate paths corresponding to the three different steps of task-guide 160 (FIG. 3). At the edge of each path is a pixel map of the respective GUI object. In particular, path 191 and pixel map 192 represent the "Start" button (step 1); path 193 and pixel map 194 represent the "Shutdown" tab (step 2); and path 194 and pixel map 196 represent the "Restart" text selection (step 3). The root element of UIA tree 190 represents the desktop. For each node in the tree four properties (out of dozens) are presented: Name, Class (the ClassName), LCT (the LocalizedControlType), and Rect (the bounding rectangle of the element). Using the data presented in tree paths (191, 193, 195) along with the pixel maps (192, 194, 196), the processes of task-guide 160 can be defined in terms of: OS API data-gathering techniques, image processing data-gathering techniques, or a combination of both. However, some of the properties of UIA tree 190 are strongly dependent on user preferences, such as the color and size of the pixel maps, and the bounding rectangles (Rect) of some of the UIA nodes. As a result, processes that would be defined using all the data presented in FIG. 6 would be highly sensitive to user preferences/settings (e.g., taskbar location, display magnification, screen resolution, theme colors, desktop background, and the like). Instead, a generic definition of the processes can provide robustness with respect to variations in user preferences/settings. Such a generic definition can be achieved for the OS API data-gathering technique by using a regular expression mechanism that defines a dynamic path inside the UIA tree. For the image processing data-gathering technique, a generic definition may be realized by using pattern matching that is insensitive to color and scaling.

It is noted that by incorporating different process data-gathering techniques, each of which may be particularly suited for a particular computing environments/platforms and/or user preferences/settings, allows for generating a more comprehensive task-guide that encompasses a variety of such computing environments/platforms and user preferences/settings. For example, an end user may seek assistance for the desired computing task of: "downloading images from my iPhone to a desktop computer running Windows 7 OS, arranging the downloaded images in a new folder, resizing the images with the Picasa application, and sending the resized images via my Gmail account using Internet Explorer 8". Accordingly, a single comprehensive task-guide may be generated for this task, which encompasses a variety of computing environments (e.g., software applications, hardware devices, operating systems, websites), by utilizing a plurality of the available process data-gathering techniques (e.g., OS API requests, image processing, GUI data structure requests, web browser API or web harvesting, hardware data extraction) when defining the different processes that compose this particular task-guide.

Following a request for assistance received from a task-guide executor 132 of a given end user device 130, including information associated with the particular computing environment and preferences/settings of end user device 130, administrator 122 may process the information so as to improve the process of identifying a suitable task-guide. In particular, administrator 122 may take into account all the available information in order to locate and identify a task-guide that is particularly suited for the actual needs of the end user (i.e., the desired computing task for which assistance was requested) as well as the current capabilities of the end user device 130 (e.g., the various software applications, website browsers, hardware components and the like that are operational and available for use with end user device 130). For example, an end user may enter a request for "help me send my friend this photo that I just took with my iPhone camera", which is passed on to administrator 122 via task-guide executor 132, along with the relevant information associated with end user device 130. Administrator 122 processes and analyzes all the available information, and may send back a number of relevant options to the end user in response. For example, administrator may 122 identify task-guides for the following tasks: "sending a photo to an email account using an email application"; "sending a photo to another phone using a Multimedia Messaging Service (MMS) of an instant messaging (IM) application"; and "uploading a photo to selected social networking sites using the Instagram application". Administrator 122 may simply transmit all of the suitable task-guides initially to task-guide executor 132, or alternatively may send task-guide executor 132 an indication of the various options identified, which are then presented to the end user. Task-guide executor 132 then proceeds to execute a selected task-guide on end user device 130 in accordance with the user instructions.

An existing task-guide may cease to operate correctly over time, due to changes in the user interface (UI) that the task-guide processes interact with. Such changes may be caused, for example, by new updates of: software versions, website designs, website browsers, operating systems, and the like. Accordingly, administrator 122 may monitor the existing task-guides and perform periodic editing and updating, as necessary, to ensure that the task-guides continue to operate correctly despite such changes. The actual editing of a task-guide may be performed directly by administrator 122 or may be delegated to a task-guide generator 112 of a selected author user device 110. Administrator 122 may collect data associated with the execution of various task-guides from multiple end user devices 130. The collected data may be subsequently processed and analyzed to obtain insights into the operation of the task-guides, which may be taken into account during subsequent task-guide editing. For example, administrator 122 may receive information about an unsuccessful implementation of a particular data-gathering technique attempt by a process of an executed task-guide, which can provide an indication for the need to correct or update that process (e.g., such as to implement an alternative data-gathering technique). The collected data may be utilized to link a particular task-guide (or a set of task-guides) with particular computing platforms/environments (e.g., particular versions of a software application), or to update the UI data structure associated with a task-guide that no longer functions. Additionally, data associated with the execution of certain task guides on a particular end user device 130 may be utilized to customize the subsequent execution of those task-guides for that particular end user (e.g., by providing the data and relevant instructions to the task-guide executor 132 operating on that end user device 130). Task-guide editing may also involve enhancing an existing task-guide, such as by improving its effectiveness or efficiency (e.g., performance speed, consistency, clarity), or by making it more generic (i.e., robust). It is noted that task-guides may be edited publically by any available author user device 110 (e.g., in accordance with an "open source" and/or "crowdsourcing" model). Alternatively, only a subset of author users may be provided with the authorization to perform task-guide editing at any given time.

Administrator 122 may also perform periodic testing and performance assessment of the existing task-guides (i.e., "benchmarking"), such as by executing a given task-guide on multiple VMs 126 operating under different computing environments and configurations (e.g. different software versions, different hardware, different OSs, different OS versions, different website browsers, and the like). The information obtained by such benchmarking may be utilized for editing the task-guides (as previously discussed), and also for checking and verifying a newly created or newly edited task-guide before releasing it for available execution, such as to ensure its proper functioning or to prevent any potentially harmful ramifications from the task-guide (e.g., introducing a virus or a security breach onto an end user device 130).

Figure 7:
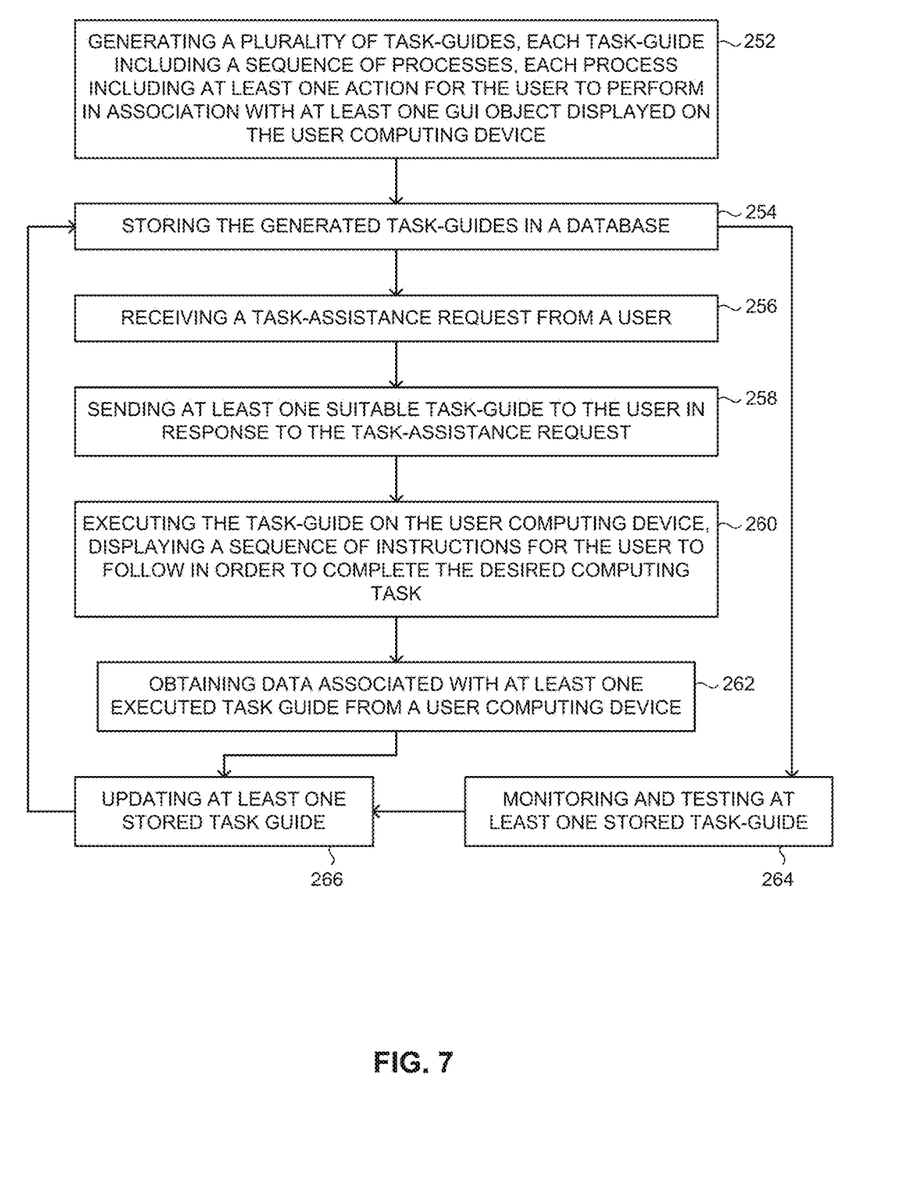
FIG. 7 is a flow diagram of a computer-implemented method for the provision of interactive assistance to a user, operative in accordance with an embodiment of the invention.

Reference is now made to FIG. 7, which is a flow diagram of a computer-implemented method for the provision of interactive assistance to a user, operative in accordance with an embodiment of the invention. The method procedures are, for example, performed automatically, but may be performed manually where indicated. The method procedures are for example, performed in real time.

In procedure 252, a plurality of task-guides is generated, each task-guide including a sequence of processes, each process including at least one action for the user to perform in association with at least one GUI object displayed on the user computing device. Referring to FIG. 1, task-guide generator 112 of author user device 110 generates new task-guides. Each task-guide represents a program which, when executed on an end user device 130, presents a sequence of instructions to be followed by the user to guide him/her through the performance of a desired computing task. Each task-guide is composed of a sequence of processes (sub-tasks). Each process includes at least one action that the user must perform in association with a GUI object visible on the display screen of end user device 130 while attempting to perform the desired computing task. For example, referring to FIG. 3, task-guide 160 guides a user through the desired task of restarting a computer in the Windows 7 OS. Task-guide 160 includes a first process associated with an action (left-click) for the user to perform in association with a first GUI object (Start icon 164), followed by a second process associated with an action (hovering pointer) to be performed with a second GUI object (shutdown icon 166), followed by a third process (left-click) to be performed with a third GUI object (Restart text selection 168).

In procedure 254, the generated task guides are stored in a database. Referring to FIGS. 1 and 2, the collection of task-guides generated by task-guide generators 112 of multiple author user devices 110 are uploaded to server device 120 and stored in database 124.

In procedure 256, a task-assistance request is received from a user. Referring to FIGS. 1 and 2, an operator of end user device 130 provides task-guide executor 132 with a request for assistance with a desired computing task. Task-guide executor 132 generates a corresponding task-assistance request for administrator 122 to provide a task-guide suited for the desired computing task. Administrator 122 receives the task-assistance request transmitted by task-guide executor 132. The task-assistance request may further include information associated with end user device 130, such as the particular computing platform/environment and the particular user preferences/settings currently in operation on end user device 130, in order to ensure that administrator 122 determines a suitable (or optimal) task-guide for the requirements of that particular end user. For example, an end user requests assistance for "initiating a videoconference session with an acquaintance over Skype". Task-guide executor 132 transmits a search request over network 150 to administrator 122 to locate an "initiating videoconference" task-guide that is adapted to function with the Skype application in general, and with Skype version 6.5.0.158 in particular, for the Android version 4.4 OS running on the end user device 130.

In procedure 258, at least one suitable task-guide is sent to the user in response to the task-assistance request. Referring to FIG. 1, administrator 122 attempts to locate a task-guide stored in database 124 which is intended for the requested task, and which is adapted to operate under the particular requirements (i.e., computing environment/platform and user settings) of the particular end user device 130. If administrator 122 fails to locate a suitable existing task-guide, administrator may provide end user device 130 with a similar task-guide (e.g., for performing a similar task) or a set of similar task-guides to choose from, or may send back a notification that no task-guide is available for the requested task. If however a suitable task-guide is identified, administrator 122 transmits the task-guide to task-guide executor 132 of end user device 130. Continuing with the previous example in which an end user requests assistance for "initiating a videoconference session with an acquaintance over Skype", administrator 122 may fail to locate an ideal task-guide adapted for this particular task and user requirements, and may instead send back task-guides that provide assistance for the following related tasks: "initiating a videoconference session using the Google Hangouts application on a device running Windows"; "initiating a videoconference session using the Viber application on a device running Android"; and "initiating a videoconference session using Tango on a device running Android". If administrator 122 does locate an ideal task-guide, it is forwarded to task-guide executor 132 of end user device 130. It is noted that administrator 122 may also identify and transmit multiple task-guides in conjunction with the requested task. For example, if the requested task is: "sending a photo of myself to an acquaintance", then administrator 122 may identify and send back a first task-guide for: "locating a photo of the user currently stored on his computing device" and a second task guide for: "emailing a file using Gmail", where the task-guide executor 132 is instructed to execute the second task-guide immediately following the first task-guide.

In procedure 260, the task guide is executed on the user computing device, displaying a sequence of instructions for the user to follow in order to complete the desired computing task. Referring to FIG. 1, task-guide executor 132 receives the task-guide(s) transmitted by administrator 122, and executes the task-guide(s) on end user device 130. The executed task-guide presents a series of steps or instructions, such as the three steps of task-guide 160 (FIG. 3) demonstrating how to restart a computer in the Windows 7 OS. Each displayed step serves to guide the end user along the process of performing the desired task, by providing specific and exact instructions in a clear and straightforward manner and ensuring that each step is correctly implemented before proceeding on to the next step. Once the end user has properly completed all of the instructions, the task-guide terminates.

In an optional procedure 262, data associated with at least one executed task guide is obtained from a user computing device. Referring to FIG. 1, administrator 122 collects data associated with different task-guides that were executed at multiple end users devices 130, such as performance results and relevant parameters. The collected data may be subsequently processed and analyzed to obtain information about the task-guide operation, which may be taken into account during subsequent task-guide editing.

In an optional procedure 264, at least one stored task guide is monitored and tested. Referring to FIG. 1, administrator 122 performs periodic testing and performance assessment of the task-guides (i.e., "benchmarking"), such as by executing a given task-guide on multiple VMs 126 operating under different computing environments and configurations. The information obtained from the testing may be utilized for editing the task-guides, and for checking and verifying newly created or newly edited task-guides.

In an optional procedure 266, at least one stored task guide is updated. Referring to FIG. 1, a task-guide generator 112 of an author user device 110 edits an existing task-guide, following instructions from administrator 122 or by the initiative of that author user device 110. The task-guide editing may be performed in accordance with data collected from the execution of the task-guide on multiple end user devices (procedure 262), and/or in accordance with data collected from testing/benchmarking of the task-guide (procedure 264). Task-guide editing may include linking the task-guide with a particular set of computing platforms/environments (e.g. particular versions of a software application). Task-guide editing may further include updating a task-guide that has ceased to properly function (e.g., due to changes or updates to a UI associated with a computing environment, such as a software application or OS update), such as by implementing suitable updates to the UI structure(s) associated with the task-guide. Task-guide editing may further include enhancing the effectiveness or efficiency of the task-guide, or augmenting the generic nature of the task-guide. Furthermore, updating a task-guide may alternatively involve customizing a future execution of the task-guide on a particular end user computing device (or a set of similar end user computing devices), based on data obtained about the results of the task-guide execution under the same computing platform/environments and user preferences/setting, by providing the relevant data and instructions to the task-guide executor 132 operating on that end user device(s) 130.

The above-described methods and method procedures, including portions thereof, may be performed by software, hardware and combinations thereof. These methods, procedures and portions thereof may be performed by computers, computing devices, workstations, processors, micro-processors, other electronic searching tools and memory and other non-transitory storage-type devices associated therewith. The methods, procedures and portions thereof can also be embodied in programmable non-transitory storage media, for example, compact discs (CDs) or other discs including magnetic, optical, etc, readable by a machine or the like, or other computer usable storage media, including magnetic, optical, or semiconductor storage, or other source of electronic signals.

The methods and systems, including components thereof, herein have been described with exemplary reference to specific hardware and software. The methods have been described as exemplary, whereby specific steps (procedures) and their order can be omitted and/or changed by persons of ordinary skill in the art to reduce these embodiments to practice without undue experimentation. The methods and systems have been described in a manner sufficient to enable persons of ordinary skill in the art to readily adapt other hardware and software as may be needed to reduce any of the embodiments to practice without undue experimentation and using conventional techniques.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A method for the provision of interactive assistance over a network for a user to complete a desired computing task on a user computing device, the method comprising:
generating a plurality of task-guides comprising a sequence of processes, each of said processes comprising at least one action for said user to perform in association with at least one graphical user interface (GUI) object displayed on a user computing device;
receiving from a user computing device a task-assistance request over said network;
receiving information about at least one computing environment of said user computing device over said network;
sending at least one task-guide of said plurality of task guides corresponding to: 1) said task-assistance request, and, 2) said at least one computing environment of said user computing device, to said user computing device over said network,
said at least one task-guide presenting a sequence of processes in accordance with information about said at least one GUI object displayed on said user computing device; and,
obtaining said information about said at least one GUI object displayed on said user computing device, using at least one data-gathering technique, said at least one data-gathering technique selected for obtaining said information about said at least one GUI object, over said network, while said at least one task guide is operating on said user computer.

2. The method of claim 1, wherein said user computing device is configured to execute said at least one task-guide, to display a sequence of instructions for said user to follow in order to complete said desired computing task.

3. The method of claim 1, wherein said data-gathering technique comprises at least one of:
sending a request to an operating system (OS) application programming interface (API);
image processing of the contents displayed on a display screen of said user computing device;
obtaining a GUI data structure from a library file;
analyzing a web page;
sending a request to a web browser API; and,
obtaining information associated with a hardware component of said user computing device.

4. The method of claim 1, wherein said at least one computing environment is selected from at least one of:
software;
operating system;
web site; and
hardware.

5. The method of claim 1, wherein said at least one task-guide is generated using at least one pre-existing process.

6. The method of claim 1, wherein at least one of said processes of said at least one task-guide is defined to operate on multiple computing environments, platforms, preferences, or settings.

7. The method of claim 1, wherein said at least one task-guide is stored in a database that is publically accessible to a plurality of author users, allowing at least a portion of said author users to generate or edit said at least one task guide.

8. The method of claim 1, further comprising the procedure of obtaining data associated with said at least one task-guide, upon said at least one task guide being executed, from said user computing device over said network.

9. The method of claim 8, further comprising the procedure of updating at least one of said task-guides, in accordance with the obtained data.

10. The method of claim 9, wherein said updating at least one of said task-guides comprises at least one procedure selected from the list consisting of:
altering at least one process of said at least one task-guide;
associating said at least one task-guide with at least one computing environment;
updating at least one user interface data structure associated with said at least one task-guide;
customizing a subsequent execution of said at least one task-guide on at least one user computing device;
improving the effectiveness or efficiency of said at least one task-guide; and
making said at least one task-guide more generic.

11. The method of claim 1, wherein said user computing device is configured to store data associated with said at least one task-guide upon said at least one task-guide being executed, for customizing a future execution of said at least one task-guide on said user computing device.

12. The method of claim 1, further comprising the procedure of updating at least one of said task-guides associated with a common application, in accordance with update information obtained from said common application.

13. The method of claim 1, further comprising the procedure of monitoring and testing at least one of said task-guides, to assess performance.

14. The method of claim 13, wherein said testing comprises executing said at least one of said task-guides on a plurality of virtual machines (VMs) operating with different computing environments.

15. The method of claim 1, wherein said task-assistance request comprises information associated with said user computing device, and wherein said at least one task-guide sent to said user computing device is selected in accordance with said information associated with said user computing device.

16. A system for the provision of interactive assistance over a network for an end user to complete a desired computing task on an end user computing device, the system comprising:
a non-transitory storage medium for storing computer components;
at least one computerized processor for executing the computer components comprising:
a task-guide generator module for operating on an end user computing device, said task-guide generator module configured to:
generate at least one task-guide comprising:
a sequence of processes, each of said processes comprising at least one action for said end user to perform in association with at least one graphical user interface (GUI) object displayed on said end user computing device, and,
obtain information about said at least one GUI object, as said at least one GUI object is displayed on said end user computing device, using at least one data-gathering technique selected for obtaining said at least one GUI object, while said at least one task guide is operating on said end user computing device over said network; and,
an administrator module configured to:
receive: 1) a task-assistance request over said network, and, 2) information about at least one computing environment of said end user computing device over said network, from an end user computing device, and,
send at least one task-guide corresponding to said task-assistance request and said end user computing device, to said end user computing device over said network, said at least one task-guide presenting said sequence of processes in accordance with said information about said at least one GUI object as displayed on said end user computing device.

17. The system of claim 16, further comprising a task-guide executor module, operating on said end user computing device, said task-guide executor module configured for executing said at least one task-guide on said end user computing device, and, displaying a sequence of instructions based on said at least one GUI object as displayed on said end user computer device, for said user to follow in order to complete said desired computing task.

18. The system of claim 16, wherein said data-gathering technique comprises at least one of:
sending a request to an operating system (OS) application programming interface (API);
image processing of the contents displayed on the display screen of said end user computing device;
obtaining a GUI data structure from a library file;
analyzing a web page;
sending a request to a web browser API; and,
obtaining information associated with a hardware component of said end user computing device.

19. The system of claim 16, wherein said administrator module obtains data associated with said at least one task-guide, upon said at least one task guide having been executed, from said end user computing device over said network.

20. The system of claim 19, wherein said administrator module updates at least one of said task-guides, in accordance with said obtained data.

21. The method of claim 2, wherein said instructions include at least one graphical indicator viewable on a said user computing device.

22. The system of claim 17, wherein said sequence of instructions includes at least one graphical indicator viewable on said end user computing device.

* * * * *